Oct. 17, 1967

C. K. CLAUER ET AL 3,347,131

QUANTITATIVE IMAGE MEASUREMENT
PROCESS FOR PRINTED MATERIAL
Filed Aug. 16, 1963

*INVENTORS.*
CALVIN K. CLAUER
ROBERT L. ERDMANN

BY John L. Jackson

ATTORNEY

United States Patent Office 3,347,131

Patented Oct. 17, 1967

3,347,131

QUANTITATIVE IMAGE MEASUREMENT PROCESS FOR PRINTED MATERIAL

Calvin K. Clauer and Robert L. Erdmann, San Jose, Calif., assignors to International Business Machines Corporation, New York, N.Y., a corporation of New York Filed Aug. 16, 1963, Ser. No. 302,655
2 Claims. (Cl. 88—14)

This invention relates to image measurement processes in general and more particularly to a quantitative image measurement process which is entirely objective and independent of subjective human judgment.

As a result of the recent intensive activity in document storage, transmission and display, a growing need has arisen for a means of quantitatively evaluating document and microimage characteristics. While some work has been done in the area of "print quality" evaluation, little useful information is presently available and a good correlation between print characteristics and any of the technologies concerned, such as microfilm exposure and document readability, is completely lacking. The primary tool used for such evaluation today is human judgment, a highly subjective method in the case of documents and of little value in the evaluation of microimages.

In document storage systems, which depend upon the correct and efficient use of human skill in reading the output documents, precautions must be taken to insure that the documents introduced into storage will be readable upon retrieval. When these systems store images of documents, these precautions may take the form of insuring that the physical characteristics of the input documents can tolerate degradation introduced by the system or decreasing degradation introduced by the system, or some combination of these two. Thus, if the image storage system must handle documents ranging from printed, high contrast documents to smeared and smudgy carbon copies, some indication is needed as to whether or not images of questionable documents can be stored and retrieved. Without an objective indication, documents may be rejected, duplications of which would be readable at the output, or documents stored, duplications of which might not be readable in the output.

At present, document quality is determined by having a person make a subjective judgment of the document characteristics, and perhaps even adjust the processing procedure using this subjective judgment of document quality. Although these judgments may improve with practice and with the aid of guides, human judgments vary from observation to observation and from person to person. This variation can be attributed to the large number of variables which individually and collectively influence inter-document comparison. Examples of these variables include: object contrast, edge sharpness, contour gradiant or blur, line width or stroke width, object size or type size, viewing distance, viewing angle, viewing time, ambient illumination, black versus white background, context of material, style of type, format of material, spacing of type, past exposure to the material, alignment of type, manner of ink deposit, paper thickness, paper type, color differences, and depth of print impression on the paper.

This continuing use of subjective human judgment in systems which are designed to be flexible enough to handle a range of documents is due to the fact that an objective index of document characteristics is presently lacking. Since documents with gross differences can be easily identified, this lack of an objective index probably is most significant when an attempt is made to identify a cutoff point for document storage or when an attempt is made to manipulate the document storage processing procedure as a function of the document characteristics. As the characteristics of the documents approach a cutoff value, it takes the human evaluator an increasing amount of time to inspect the documents and also a greater number of wrong judgments result. Compounding the problem is that often the operator has no way of telling whether he has made a mistake in judgment or whether the associated processing system has changed. These problems would be greatly simplified if an objective measurement technique could be used to designate the cutoff point in document handling and processing. Such an index should ideally apply to an entire page, should be based on the physical characteristics of the documents, and should be quickly derivable by a machine to facilitate automatic machine control.

In the preceding and following discussion, a distinction is made between print characteristics and print quality. Print characteristics are those characteristics of print which can be measured in physical terms while print quality is a subjective rating of the acceptability and legibility of the print which depends on human reactions to these characteristics.

It is an object of the present invention to provide a novel image measurement process wherein objective measurements are provided which may be utilized to designate cutoff points in document handling and processing.

Another object of the present invention is to provide an improved image measurement process which is quantitative and applicable to an entire document.

Another object of the present invention is to provide an image measurement and evaluation process which is entirely objective and does not depend on subjective human judgment.

Another object of the present invention is to provide an image measurement process which is machine-derivable.

Another object of the present invention is to provide an image measurement process in which random scanning is utilized.

Another object of the present invention is to provide an image measurement process wherein objective measurements of most of the important print characteristics are accurately and conveniently provided.

Other and further objects and advantages of the invention will be apparent from the following more particular description of the preferred embodiment of the invention, as illustrated in the accompanying drawings in which:

FIG. 1*a* and 1*b* is an idealized graphical representation of pulses produced through use of a typical microdensitometer technique;

Briefly, in accordance with one system of implementing the subject method of print evaluation, an elemental scanning means such as an aperture is moved at a constant velocity relative to a subject to be evaluated. Opto-electronic means such as a photocell in operable association therewith transduces the reflected or transmitted light, as modulated by the subject, to voltage. The same path is repeatedly scanned and the time that the voltage from the photocell exceeds a number of voltage levels is summed for each of the voltage levels and the resultant summations averaged for each voltage level. These times are then plotted against their associated voltage levels, which are proportional to reflectance levels, to provide a composite trace from which objective measurements of print characteristics for the entire document can be taken even though it is made from a finite sample of crossings along the scan line.

For a more detailed description of the subject novel process, refer first to FIG. 1 wherein is shown a graphical representation which might be obtained through use of conventional scanning techniques, such as those employed in the microdensitometer arts, wherein an elemental scanning element is moved at a constant velocity relative to an image and a photocell is used to transduce light intensity and position on the image to voltage (or current) and time.

The image to be scanned may be a transmission or reflection modulator of the incident light (transparency or opaque) and the line intelligence may be of either the maximum or minimum intensity (negative or positive). If scanning a transparency, the ratio of intensity in a given area with respect to the incident intensity is called transmittance, whereas with an opaque image, the ratio of diffuse reflected intensity from a given area with respect to the incident intensity (or to the intensity from a "perfect diffuse reflector") is called reflectance. Although the process to be described is unrestricted as to the nature of the image to be measured, this characteristic will be called reflectance hereafter and the term transmittance can be substituted.

Figure 1A:
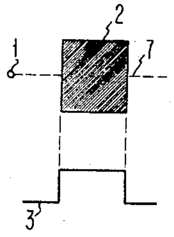
Figure 1B:
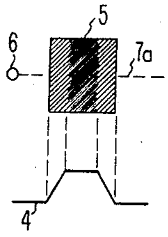

As illustrated in FIG. 1*a*, if an aperture 1, infinitely small with respect to the print bar 2, were moved across the print bar along path 7 and the light intensity seen by the aperture plotted as a function of position the waveform 3 would result. In this idealized case the rise and fall times of the waveform 3 are quite rapid since the edge sharpness of the print bar 2 is quite good and the size of the aperture 1 made quite small. As illustrated in FIG. 1*b*, however, in actual practice the waveform 4 produced would not have an extremely rapid rise and fall time. Instead, the edges of the waveform would be sloped. This slope results from several conditions such as the response time of the associated photocell, the size of the aperture 6, the scanning velocity and actual print bar edge sharpness. Assuming constant response from the photocell, uniform aperture size and scanning velocity, the slope of a waveform generated would be indicative of print bar edge sharpness. Thus, in the case where the edge of the print bar is not sharp as in the case of print bar 5, the rise and fall times of the waveforms will be greater.

As is obvious, additional information is also available from the waveform 4. For instance, pulse width is indicative of stroke width while amplitude is indicative of print darkness or reflectance. Contrast may therefore be defined as the difference between the base of the pulse (paper reflectance) and amplitude of the pulse.

Subjective human judgment has in the past been used in most systems rather than recording microdensitometer techniques due to the relatively large amount of time required to plot the waveform of a single character while using microdensitometer techniques. If a quantitative measurement is to be taken, the problem is compounded not only by the unrealistically large amount of time required, but additionally, by the form of the numerous waveforms produced which somehow or other must be individually evaluated and these evaluations summed or otherwise manipulated to arrive at an overall document evaluation. The problem is further complicated by the fact that if only several random samples are taken, they may not be representative of the print characteristics of the entire document.

For the type of document index desired, it seemed questionable whether any measurement technique could be applied in a meaningful manner for alpha-numeric information, particularly for an entire document. The main difficulty with alpha-numeric information is that the characters are composed of straight lines of many angles and many widths, and of curved lines. In scanning letters such as capital "E," if the scanning aperture follows the long, vertical line, a single relatively long pulse results, and if the aperture crosses the horizontal bars, three relatively short pulses result. In scanning curved lines, such as an "O," when the aperture crosses the exact center, two relatively short pulses result. If the aperture moves off center, the slopes of the pulses decrease and the pulse duration increases until a point is reached where only a single relatively long pulse occurs. Finally, in all characters, the scanning aperture may only partially intersect a segment of the character resulting in a pulse of relatively low amplitude. Additional difficulties include problems of how to handle document format, missing letters, type styles, and scanning angle in such an index.

With the objective that the index should apply to an entire document applicant felt that a single isolated measure of a single character would have little effect or meaning on the total index and perhaps the above problems might be overcome by consolidating or bunching together many isolated observations into a single value and that the observations need not be taken along a single line of print which would present alignment problems not conducive to machine derivation, but could be taken along any path such as 45° with respect to the lines of print. The combining of a number of microdensitometer curves generated from random samples would provide some of the important print characteristics if applicant's postulate were valid, but measure of other important print characteristics would not be provided. Additionally, the averaging of waveforms of the type provided through use of microdensitometer techniques was technically quite difficult. Some method of providing readings from a photocell scanner which was conducive to averaging was necessary if applicant's postulate were to be proved.

Figure 2:
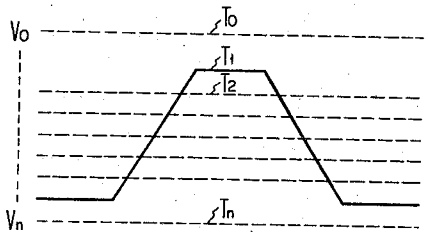
FIG. 2 is a graphical representation of the quantitative method herein taught of generating a plot equivalent to the microdensitometer output of FIG. 1*b*, but which can be readily utilized in the overall novel image evaluation process herein presented.

The microdensitometer output, as previously stated, is a voltage proportional to the amount of energy received by a photocell through an aperature. Applicant reasoned that, as illustrated, in FIG. 2, the microdensitometer waveform contains the total time ($t$) that the output of a photocell exceeds a given voltage level. Thus, given a large number of samples from $V_0$ through $V_n$, a waveform similar to that which could be obtained by use of microdensitometer techniques can be generated simply by plotting the time that the output of the photocell exceeds the various sample voltages.

Going further then, applicant realized that, while the averaging of complete microdensitometer waveforms of the type similar to those of FIG. 1 would be quite difficult, it should be fairly simple to sum the time that the output voltage of a photocell exceeded a given level as it scanned across a page, and that by taking the time sums at various reflectance or voltage levels, a composite waveform would result containing at least as much information as would have been available if each character had been carefully microdensitometered and the resultant individual waveforms somehow averaged. Thus, a workable scheme for averaging the print characteristics of the entire page evolved.

Figure 3:
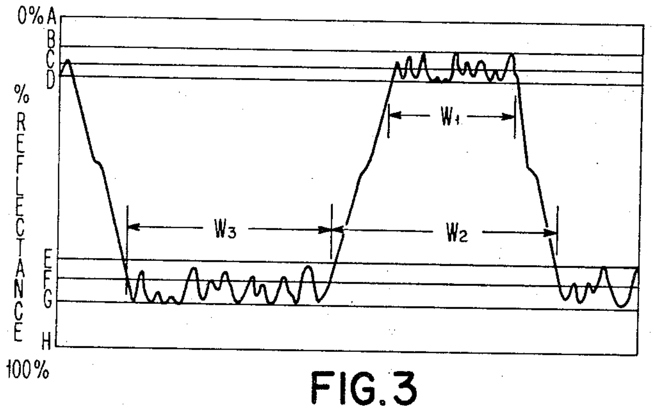
FIG. 3 is a typical trace generated by scanning a document having printing thereon with an opto-electronic arrangement such as a photocell and associated amplifier.
Figure 4:
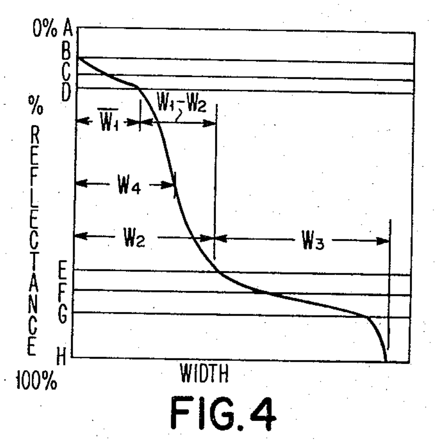
FIG. 4 is a representative trace produced in accordance with the method herein described of quantitatively sampling the print content of a document and generating a plot of average line widths versus reflectance levels from which important print characteristics can be ascertained.

Refer next to FIG. 3 which is a detailed waveform representative of the output of a photocell as it scans across actual printing. Various levels A through H are identified in FIG. 3 as well as FIG. 4. These levels in both FIGS. 3 and 4 are identical and the explanation relating to them is common to both FIGS. 3 and 4. Level A represents 0% reflectance while level B represents minimum print reflectance (darkest print). Level D represents maximum print reflectance while level C, which is the mean between levels B and D, represents average print reflectance. Level E represents the minimum background or paper reflectance while level G represents maximum background reflectance and level F then is average background or paper reflectance. Clearly, then, level D minus level B represents print irregularity while level G minus level E represents background or paper irregularity. Likewise, in FIGS. 3 and 4 are shown various widths W1 through W3. The widths of FIG. 3 apply to the single pulse shown whereas the widths of FIG. 4 represent average width or summations of a number of the widths of waveforms similar to that of FIG. 3 generated from a number of samples. In FIG. 3

$$\frac{W2-W1}{2}$$

represents edge distance while W3 represents space width. In FIG. 4, as previously discussed in connection with FIG. 3

$$\frac{W2-W1}{2}$$

represents edge distance or sharpness, W3 represents space width, and W4 represents print width. Again, as previously stated, the plot of FIG. 4 is a plot representing the average print characteristics of a document and, thus, the widths shown thereon are average widths and the levels are average levels. Thus, from the plot of FIG. 4 meaningful information relating to (1) average background reflectance, (2) average print reflectance, (3) average edge transition ditsance, (4) average print bar width, (5) average space between print bar crossings, (6) variation in print reflectance, and (7) variation in background reflectance could be obtained for the entire document.

Figure 5:
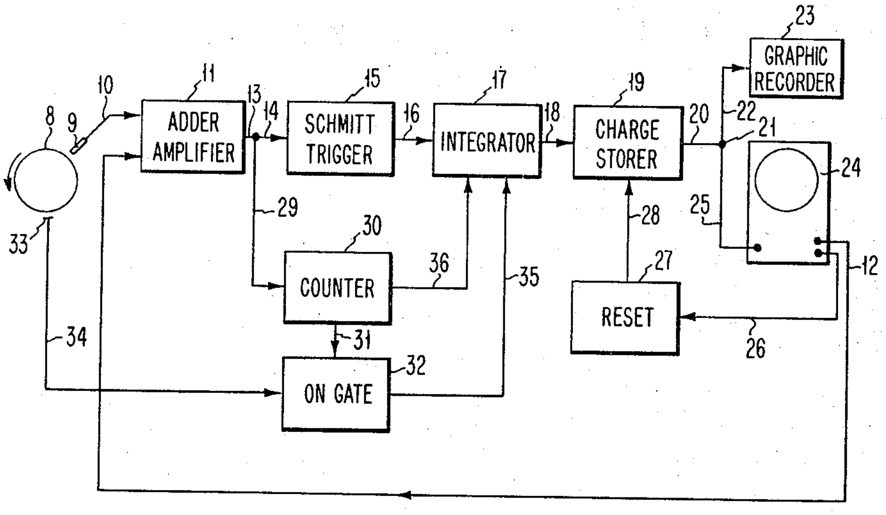
FIG. 5 is a block diagram of a system designed to implement the subject inventive process.

Refer next to FIG. 5 wherein is shown a block diagram of a system which may be utilized in accordance with the present invention to provide a plot of the average print characteristics of print of a document. The system of FIG. 5, as stated above, provides an effective average of the total microdensitometer type waveforms of the print content in accordance with the above discussion wherein the method presented was to sum the time that the output voltages of a photocell exceeded given levels as it scanned across a page and to take a number of runs at various levels to provide a composite waveform containing the exact information which would have been available if each character had been carefully microdensitometered and the resultant waveforms averaged. Thus, in FIG. 5 is illustrated a workable system for implementing the above described scheme for averaging the print characteristics of the entire page.

In FIG. 5 is shown a drum 8 upon which may be mounted a document, the print characteristics of which are to be evaluated. The drum 8 may be supported and rotated by any suitable means (not shown). In scanning association with a document when it is mounted on the drum 8 is a photocell 9 which is connected along line 10 to an adder-amplifier 11. The adder-amplifier 11 also receives an input along line 12 from an oscilloscope 24 or other similar type of ramp generator. The output of the adder-amplifier is fed along line 13 through junction 14 to a Schmitt trigger 15. The output of the Schmitt trigger is fed along line 16 to an integrator 17. The output of the integrator 17 is fed along line 18 to a charge storer 19 which in turn is connected along line 20 to junction 21. Junction 21 is connected along line 22 to a graphic recorder 23 and along line 25 to the oscilloscope 24. The oscilloscope 24 in addition to being connected to the adder-amplifier 11 along line 12 is connected along line 26 to a reset means 27. The reset means 27 is connected along line 28 to the charge storer 19.

Junction 14 at the input to the Schmitt trigger 15 is connected along line 29 to a counter 30. The counter 30 also is connected along line 31 from an ON gate 32. A small sensing photocell 33 is in scanning association with the document mounted on drum 8 and has its output fed along line 34 to the ON gate 32. The output of the ON gate 32 is fed along line 35 to the integrator 17. The output of the counter 30 is connected to and makes up the third input along line 36 to the integrator 17.

In operation, a document that is to be evaluated is mounted on the drum 8 in optical association with the photocells 9 and 33. The drum is rotated and the output of the photocell 9, which is an analog signal representative of the print content of the document, is fed along line 10 to the adder-amplifier 11. In the adder-amplifier 11 this signal is added to a relatively slow rising ramp signal supplied along line 12 from the oscilloscope 24. It has been found that fifty scans per ramp will yield fairly good resolution in the final trace. The number of scans may, however, be varied depending upon the resolution required. The output of the adder-amplifier 11, which is the amplified analog signal from the photocell 9 added to the ramp signal, is fed into the Schmitt trigger 15 along line 13. The input level or window of the Schmitt trigger 15 is set such that because of the ramp, a lower portion of the print pulses operate the trigger for each successive scan. Since the pulses widen for higher reflectance levels, the trigger is on slightly longer for each pulse on each successive scan. The output of the trigger, which is a train of pulses of constant amplitude the width of which depends on the width of the incoming pulses, is fed along lines 16 to the integrator 17. A set number of these pulses is integrated in the integrator 17 for each scan. The number is controlled by the counter 30 which acts along line 36 to reset the integrator 17 when the present number of pulses has been received.

The counter 30 acts to not only reset the integrator 17, but also holds it off until the next scan so that the output line 18 of the integrator 17 will not have an output on it after the preselected number of pulses has been counted. The amplitude of any particular integral is proportional to the width of the incoming pulses at the reflectance level that was operating the trigger for that scan. Since the pulses from the Schmitt trigger becomes wider for each successive scan, each integral is larger than the preceding integral. Each successive integral represents the width of a higher reflectance level. Finally, the ramp lifts the highest reflectance level on the document above the Schmitt trigger "on level" and the output is one continuous pulse, but, the integration of this pulse is still terminated at the end of the same number of incoming pulses counted by the counter 30 which provides the sharp fall on the right hand portion of the curve of FIG. 4. Thus, the final few integrals are proportional to the same scan length that contain the preset number of print crossings. Therefore, the difference between the final integrals and those in the middle of the train is proportional to the space between print crossings. The envelope of the train of integrals fed along line 18 to the charge storer 19 provides the final trace as represented in FIG. 4. The amplitude of each integral is transferred along line 18 to the charge storer 19 which may be a capacitor or similar type store. The instantaneous voltage on the charge storer 19 when viewed on an oscilloscope or recorded on the graphic recorder 23 provides the trace of FIG. 4.

At the end of each ramp, the oscilloscope 24 furnishes an indication of the end of the ramp along line 26 to the reset means 27 which along line 28 removes the charge from the charge storer 19 thereby effectively resetting it.

Integration of the same pulses in the integrator 17 during each scan is controlled by the ON gate 32 and counter 30. The ON gate 32 is triggered by the photocell 33 at the beginning of each scan along line 34. The ON gate starts the integrator 17 along line 35 and the counter 30 along line 31. The counter 30 is AC coupled to the adder-amplifier 11 along line 29 and is not affected by the ramp. When the set number of print crossings has been made, the counter 30, as previously stated, resets itself and the integrator 17 and turns off the ON gate 32.

Experimentation, utilizing the above described system, confirmed that successful results are not dependent on the meticulous aligning of a particular print line with the scanning photocell. Instead, the scan may be at random and in actual practice better and more consistent results have been attained through scanning at an angle of 45° wtih respect to the print lines.

It will, of course, be understood that while the particular system provided for implementing the subject process utilizes repeated scanning to provide different reflectance levels that, other systems could be provided which, from a single scan, could provide the needed information which is the time that the pulses exceed different reflectance levels.

It should be further understood that the system described heretofore for plotting a curve representative of the print characteristics of an image merely constitutes one way of providing the results of the scanning and processing in accordance with the subject novel method. While this type of trace constitutes a convenient laboratory tool, in other environments meter outputs or control signals representative of the print characteristics of interest could be provided. Thus, in the case of an automated image processing system, control signals would be provided which would be used as the basis for varying light intensity, exposure time, aperture opening, etc.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A method of generating a graphical representation of print characteristics of an entire image comprising the steps of:

scanning the same path on said image to provide a continuous output which is proportional to the print reflectance of the scanned image, generating a plurality of output levels, adding the amplitude of the instantaneous value of said continuous output to the amplitude of said output levels to form a sum, summing the time that the amplitude of said sum exceeds the amplitude of a predetermined level, averaging said summations for each output level, and recording said averaged summation for each output level producing a record representative of the print characteristics of the image.

2. The method of claim 1 wherein the same path of said image, composed of a plurality of print lines, is scanned at an angle of substantially 45° to the print lines.

References Cited

UNITED STATES PATENTS

| | | | |
|---|---|---|---|
| 2,834,247 | 5/1958 | Pickels | 88—14 |
| 3,053,181 | 9/1962 | Jorgensen | 88—14 |
| 3,101,415 | 8/1963 | Libenschek | 250—214 X |
| 3,202,042 | 8/1965 | Jamieson et al. | 88—14 |

JEWELL H. PEDERSEN, *Primary Examiner.*

F. SHOON, O. B. CHEW, *Assistant Examiners.*